Figure 1:
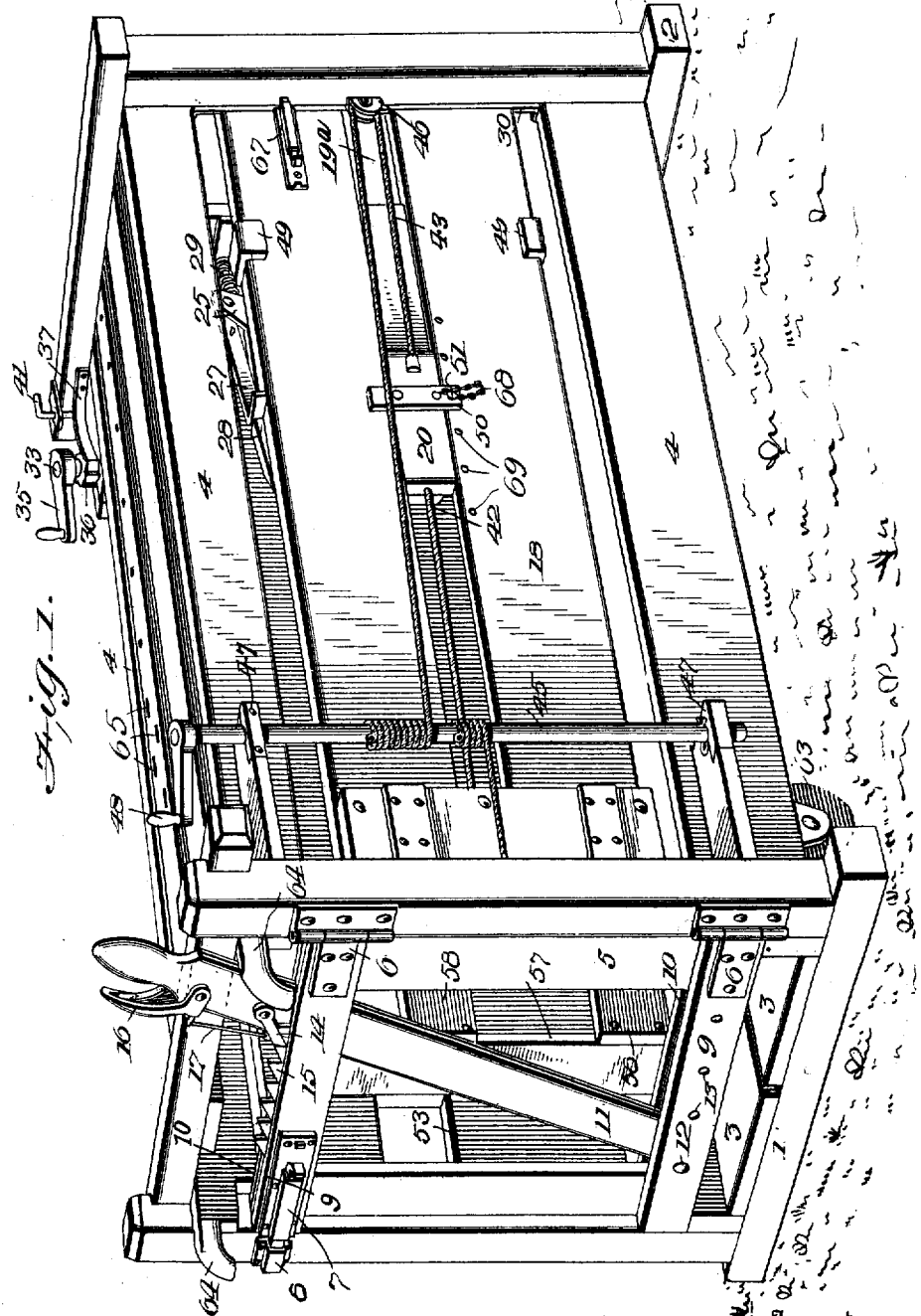

W. S. PHILLIPS.
HOG TRAP.
APPLICATION FILED FEB. 28, 1908.

902,998.

Patented Nov. 3, 1908.
4 SHEETS—SHEET 1.

Witnesses
F. C. Barry
C. E. Tranor

Inventor
WILLIAM S. PHILLIPS
By Attorneys Munn & Co.

W. S. PHILLIPS.
HOG TRAP.
APPLICATION FILED FEB. 28, 1908.
902,998.
Patented Nov. 3, 1908.
4 SHEETS—SHEET 2.
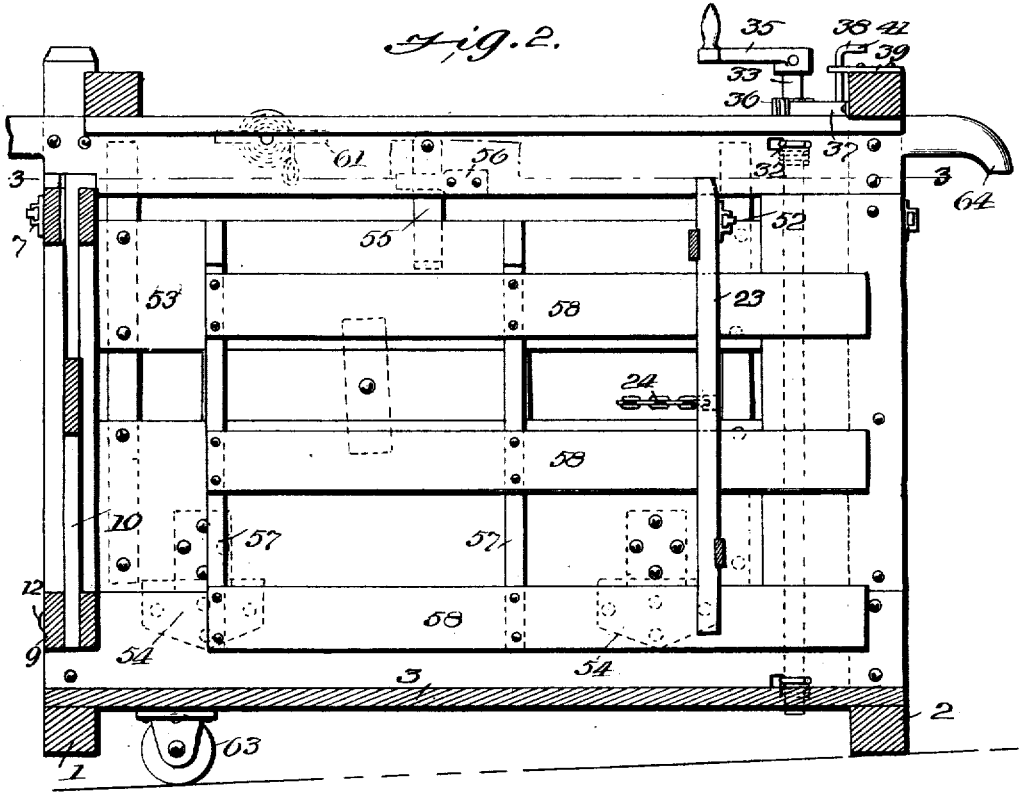
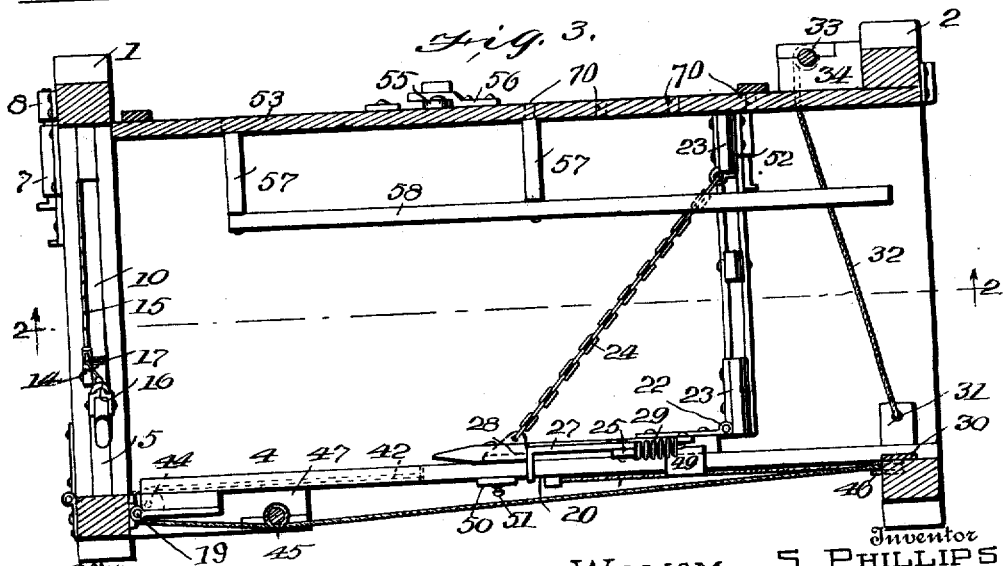
Witnesses
F. C. Barry
C. E. Traver
Inventor
WILLIAM S. PHILLIPS
By Attorneys Munn & Co.

W. S. PHILLIPS.
HOG TRAP.
APPLICATION FILED FEB. 28, 1908.
902,998.
Patented Nov. 3, 1908.
4 SHEETS—SHEET 3.
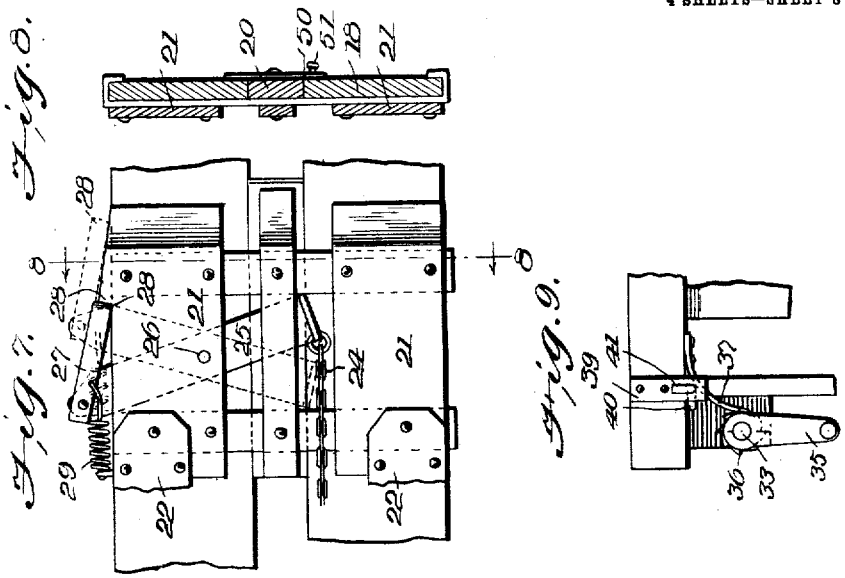
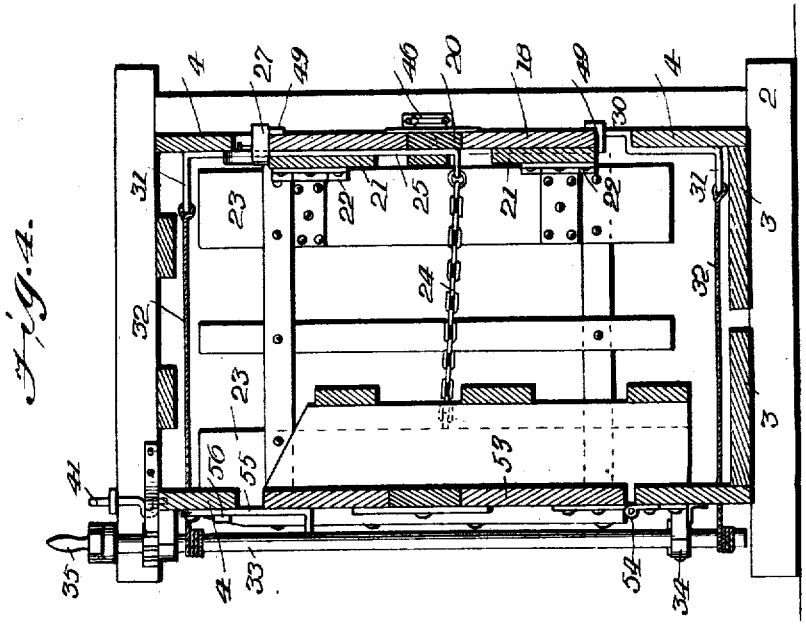
Witnesses
F. C. Barry
C. E. Trainor
Inventor
WILLIAM S. PHILLIPS
By Attorneys Munn & Co.

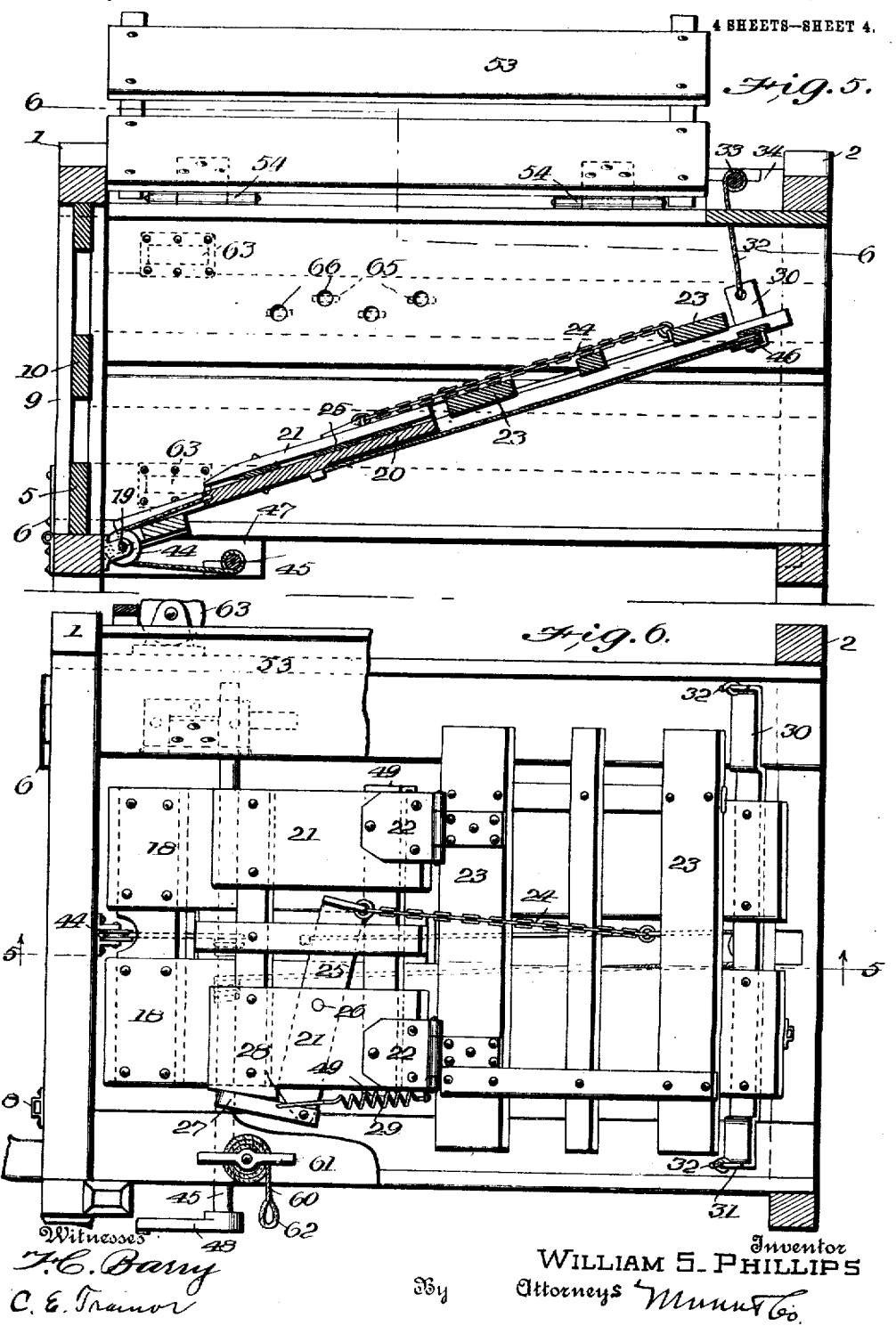

UNITED STATES PATENT OFFICE.

WILLIAM S. PHILLIPS, OF WOLFRUN, WEST VIRGINIA.

HOG-TRAP.

No. 902,998.  Specification of Letters Patent.  Patented Nov. 3, 1908.

Application filed February 28, 1908. Serial No. 418,247.

*To all whom it may concern:*

Be it known that I, WILLIAM S. PHILLIPS, a citizen of the United States, residing at Wolfrun, in the county of Marshall and State of West Virginia, have invented a new and useful Improvement in Hog-Traps, of which the following is a specification.

My invention is an improvement in hog traps, and consists in certain novel constructions and combinations of parts hereinafter described and claimed.

Referring to the drawings forming a part hereof, Figure 1 is a perspective view of the trap from the front. Fig. 2 is a section on line 2—2 of Fig. 3 looking in the direction of the arrows. Fig. 3 is a horizontal section through the trap. Fig. 4 is a transverse section looking toward the rear of the trap. Fig. 5 is a section on the line 5—5 of Fig. 6 looking in the direction of the arrows. Fig. 6 is a section on the line 6—6 of Fig. 5. Fig. 7 is a detail of the locking mechanism for the rear door. Fig. 8 is a section on the line 8—8 of Fig. 7 looking in the direction of the arrows and Fig. 9 is a detail of the pawl and its releasing mechanism.

The present embodiment of the invention, comprises a frame work composed of two rectangular end frames 1, 2, connected by bottom plates or boards 3, and by corner pieces 4, the boards and the corner pieces being arranged inside of the frames. The front end is closed by a door 5, comprising an open frame hinged as at 6 to the frame work, and locked in its closed position by a bolt 7, engaging a staple 8 on the frame work.

The upper and lower members of the frame composing the door, consist each of parallel spaced boards or plates 9, 10, and between the lower pair is pivoted a bar 11, by means of a pin 12 engaging one of a series of openings 13 in the plates 9, 10, and a registering opening in the bar. The upper end of the bar moves between the upper plates 9, 10, and is provided with a tooth 14, for engaging a series of ratchet teeth 15 arranged on the outer plate, the tooth being operated by a grip 16, pivoted to the bar and connected by a link 17 with the tooth.

One of the open sides of the frame work, in the present instance the right, is closed by a door 18, hinged to the front frame 1 as at 19, and resting against the inside of the rear frame 2. The door 18 is provided with a longitudinal opening 19ª, forming a guideway in which moves a lug 20, connected with a slide 21, having hinged to the rear end thereof as at 22, a door 23, which is the rear door of the trap.

The door 23 is connected by a chain 24, with one end of a lever 25, pivoted as at 26 to the slide, and the opposite end of the lever is provided with a pivoted pawl or tooth 27, adapted to engage a notch 28 on the slide, to retain the door 23 at right angles to the slide as shown in Fig. 3. A spring 29, connected with the tooth acts to retract the slide so that the tooth will engage with the notch.

It will be evident from the description that when the door 23 is arranged at right angles to the slide, the spring will move the lever to bring the pawl into engagement with the notch, to retain the door in the said position.

The free end of the door 18 before described, is provided with a transverse bar 30, having angular ends 31, provided with openings for receiving ropes 32, which pass across the trap to a shaft 33, journaled in bearings 34, on the frame work and rotated by a crank 35. The shaft is provided with a ratchet wheel 36, normally engaged by a spring pawl 37, which is releasable by means of a rod 38 journaled in bearings 39 on the frame 2, and provided with a cranked portion 40 for engaging and releasing the pawl, and a handle 41 for manipulating the rod.

The lug 20 on the slide 21 before mentioned has connected to one end thereof a rope 42, and to the other end a rope 43. The rope 42 passes to the front of the frame work and over a pulley 44 to a shaft 45, upon which the end of the rope winds. The rope 43 passes to the rear of the frame work and over a pulley 46, thence returning to the shaft 45, upon which the end thereof also winds. The shaft 45 is journaled in bearings 47 on the frame work and is operated by a crank 48. The slide 21 is provided with guides 49, engaging the upper and lower edges of the door 18, and the lug 20 is provided with a cross plate 50 bolted thereto, and engaging the outer face of the door, the plate having connected therewith a pin 51.

The door 23 is provided with a bolt 52, which is adapted to engage one of a series of openings 70 in the side of the frame work, when the door is arranged transversely of the trap, and the opposite side of the trap from the door 18, is closed by a door 53, hinged as at 54 to the frame work, and retained in closed position, by a bar 55, pivoted to the frame work, and braced by a bracket 56 also on the frame work. The door 53 is also provided with a plurality of spaced parallel vertical strips 57, to which are secured spaced horizontal boards 58 forming a false lining for the door.

In the use of the trap, the hog is driven into the crate through the rear door 23, the slide being previously moved to the rear of the trap, and the side and front doors being closed. The rear door is then closed, that is placed at right angles to the slide and secured by the lever 25. The shaft 45 is then rotated, thus moving the slide and rear door forward until the hog's head is forced through the front door frame, after which the bar 11 is moved to lock the head between same and the side of the door frame, the bar being retained in place by the tooth or pawl 14. The hog is now in position for removing tusks or ringing or any other operation about the head, and is firmly retained in such position by the rear door and the bar 11. In castrating hogs, or in other operation about the body, the rear door is moved into alinement with the slide, after the hog's head is secured, and the trap is turned on its side with the door 18 beneath.

With the trap in the above position the shaft 33 is rotated to place the door 18 in the inclined position shown in Fig. 5, thus raising the hind quarters of the animal to the top of the trap. The door is locked in this position by the pawl 37, and the side door 53 is opened, thus giving access to the side and rear of the hog, and placing the animal in the best possible position for operations. A rope 60 is provided, normally wrapped upon a cleat 61, 61, for receiving the uppermost hind leg, the rope being provided with a loop 62, for attachment to the foot. For convenience in moving the trap, it is provided with wheels 63, at one end, and with handles 64 at the top. A plurality of slots 65 are provided in the top of the trap, in alinement with openings 66 in the bottom, for receiving a bar (not shown), to be inserted when the door 53 is open to prevent the hog from raising its body from the slide. A latch is provided on the free end of the door 18 for securing the door when the trap is used as a shipping crate. The pin 51 before mentioned is connected to the plate 50, by a chain 68, and a series of openings 69 are provided in the door 18, the pin passing through the openings 69 and a registering opening in the plate, so that the slide may be fastened in adjusted position.

It will be observed from an inspection of Figs. 2, 3 and 4 that the false lining of the door 53, is removable, the uprights 57 having secured to their outer faces a board 57ᵃ to which is pivoted a button 57ᵇ. The board 57ᵃ is received between two of the boards of the door, as clearly shown in the above mentioned figures, and the button is turned transversely of the board to retain the lining in place as shown in Fig. 4.

I claim—

1. A hog trap comprising an open frame work, a side door hinged at the front of the frame work and provided with a guideway, a slide movable in the guideway, a rear door hinged to the rear end of the slide, means for moving the slide longitudinally of the door, means for locking the rear door at right angles to the slide, a shaft journaled at the rear of the trap on the opposite side from the side door, ropes winding on the shaft and connected with the rear end of the side door, releasable means for preventing reverse rotation of the shaft, an open door frame hinged to the front of the frame work, means for locking the door frame, a bar pivoted to the lower part of the door frame and swinging transversely of the trap, means for locking the upper end of the bar in adjusted position, and a second side door hinged to the opposite side of the frame work from the first side door.

2. A hog trap comprising a frame work, a side door hinged to the front of the frame work, means connected with the free end of the door for swinging said door transversely of the frame work, a slide movable longitudinally of the side door, means for moving the slide, a rear door hinged to the rear end of the slide and arranged to swing at right angles to the slide, a lever pivoted to the slide, a connection between one end of the lever and the rear door, a pawl pivoted to the other end of the lever, the slide having a notch for engagement by the pawl to lock the rear door at right angles to the slide and a spring normally acting on the lever to move the pawl into engagement with the notch.

3. A hog trap comprising a frame work, a side door hinged to the front of the frame work, means connected with the free end of the door for swinging said door transversely of the frame work, a slide movable longitudinally of the side door, means for moving the slide, a rear door hinged to the rear end of the slide and arranged to swing at right angles to the slide, and means for locking the door in such position.

4. A hog trap comprising a frame work, a side door hinged to the front of the frame work, means connected with the free end of the door for swinging said door transversely of the frame work, a slide movable longitudinally of the side door, means for moving the slide, a rear door hinged to the rear end of the slide and arranged to swing at right angles to the slide, means for locking the door in such position, an open door frame hinged to the front of the frame work, a bar pivoted to the lower part of the door frame and swinging transversely thereof, and means for locking the bar in adjusted position.

5. A hog trap comprising a frame work, a side door hinged to the front of the frame work, means connected with the free end of the door for swinging said door transversely of the frame work, a slide movable longitudinally of the side door, means for moving the slide, a rear door hinged to the rear end of the slide and arranged to swing at right angles to the slide, means for locking the door in such position, an open door frame hinged to the front of the trap, and means in connection with the door frame, for engaging the head of an animal in the trap.

6. A hog trap comprising a frame work, a side door hinged to the front of the frame work, means connected with the free end of the door for swinging said door transversely of the frame work, a slide movable longitudinally of the side door, means for moving the slide, a rear door hinged to the rear end of the slide and arranged to swing at right angles to the slide, means for locking the door in such position, and means at the front of the frame work for engaging the head of an animal in the trap.

7. A hog trap comprising an open frame work, a door hinged to the bottom of the frame and closing one side thereof, a door hinged to the front of the frame and closing the other side, means connected with the free end of the last named door for swinging it on the hinged connection, means for locking the door in its adjusted position, a slide movable longitudinally of the trap, means for moving the slide, a door hinged to the slide for swinging transversely of the trap, means for locking said door at right angles to the slide, and means at the front of the frame work for engaging the head of an animal in the trap.

8. A hog trap comprising a frame work, a door hinged to the front of the frame, means connected with the free end of the door for swinging it on the hinge connection, a slide movable longitudinally of the trap, means for moving the slide, a door hinged to the slide, and means for locking the said door at right angles to the slide.

WILLIAM S. PHILLIPS.

Witnesses:
L. L. PHILLIPS,
J. A. CUNNINGHAM.